United States Patent [19]

Miyawaki et al.

[11] Patent Number: 5,242,216
[45] Date of Patent: Sep. 7, 1993

[54] ANTILOCK BRAKE CONTROL APPARATUS

[75] Inventors: Yoichi Miyawaki; Hideaki Fujioka, both of Itami, Japan

[73] Assignee: Sumitomo Electric Industries, Ltd., Osaka, Japan

[21] Appl. No.: 913,945

[22] Filed: Jul. 17, 1992

[30] Foreign Application Priority Data

Jul. 30, 1991 [JP] Japan .................................. 3-189873

[51] Int. Cl.$^5$ .................... B60T 8/66; B60T 8/70
[52] U.S. Cl. ................... 303/106; 188/181 A; 303/108; 303/109; 303/110; 303/119.2; 303/900; 364/426.02
[58] Field of Search ............... 303/102, 103, 106, 107, 303/108, 109, 110, 105, DIG. 1, DIG. 2, 900, 901, DIG. 3, DIG. 4, 119.2, 119.1, 115.2; 188/181 A, 181 C; 364/426.01, 426.02

[56] References Cited

U.S. PATENT DOCUMENTS

| | | |
|---|---|---|
| 3,787,094 | 1/1974 | Harned et al. . |
| 4,585,280 | 4/1986 | Leiber . |
| 4,693,522 | 9/1987 | Wupper et al. . |
| 4,973,108 | 11/1990 | Maki et al. . |
| 5,033,799 | 7/1991 | Braschel . |
| 5,076,538 | 12/1991 | Mohr et al. . |
| 5,116,109 | 5/1992 | Kuwama et al. ................... 303/109 |

FOREIGN PATENT DOCUMENTS

| | | |
|---|---|---|
| 0345731 | 12/1989 | European Pat. Off. . |
| 0423755 | 4/1991 | European Pat. Off. . |
| 3402794 | 9/1984 | Fed. Rep. of Germany . |
| 3402795 | 9/1984 | Fed. Rep. of Germany . |
| 3925465 | 2/1990 | Fed. Rep. of Germany . |
| 4016756 | 11/1991 | Fed. Rep. of Germany . |
| 61-81261 | 4/1986 | Japan . |
| 2241026 | 8/1991 | United Kingdom . |

OTHER PUBLICATIONS

Patent Abstracts on Japan, vol. 10, No. 253, (M-152) (2309), Aug. 29, 1986.

*Primary Examiner*—Douglas C. Butler
*Attorney, Agent, or Firm*—Sandler Greenblum & Bernstein

[57] ABSTRACT

The antilock brake control apparatus has a locking symptom detector for detecting a wheel locking symptom and a removal of wheel locking symptom. A microcomputer is provided for producing a depressurization signal in response to the detection of the wheel locking symptom until the removal of the wheel locking symptom, and for calculating, after a locking symptom is detected, a pressure difference between the current wheel cylinder pressure and the wheel cylinder pressure when a locking symptom is first detected to obtain a maximum pressure difference at a time when the removal of the wheel locking symptom is detected. The microcomputer further produces a slow pressurization signal in response to the removal of the wheel locking symptom and during an asynchronous state, in which a difference between the wheel speed and the estimated vehicle speed is more than a predetermined range, and a rapid pressurization signal in response to the establishment of the synchronous state, in which the difference is within the predetermined range, and until the wheel cylinder pressure is increased to gain a predetermined percentage of the maximum pressure difference.

4 Claims, 9 Drawing Sheets

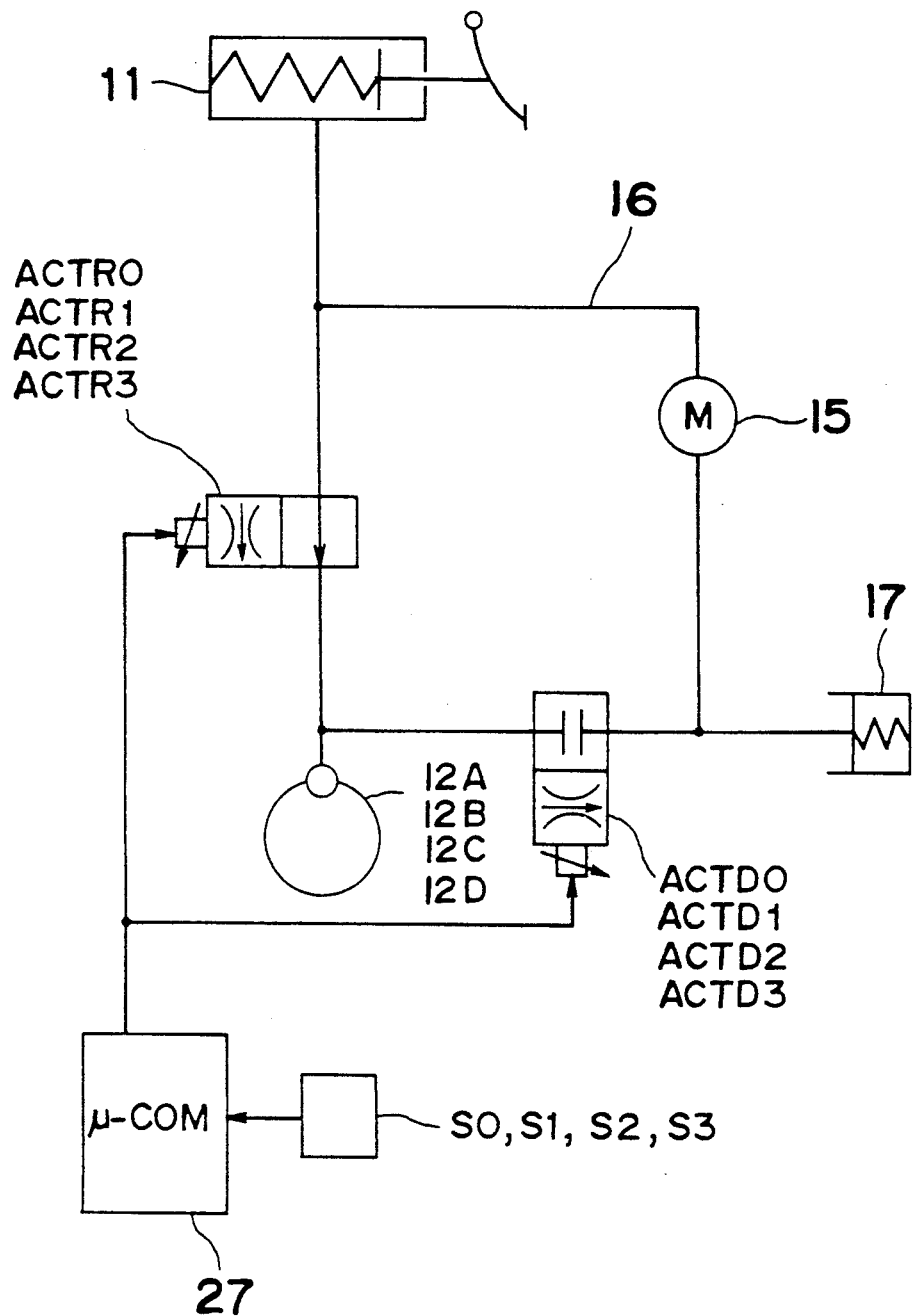

ANTILOCK BRAKE CONTROL APPARATUS

BACKGROUND OF THE INVENTION

1. Field of the Invention

The present invention relates to an antilock brake control apparatus for use in a vehicle for providing more precise control of the wheel cylinder pressurization and depressurization rate, and providing improved vehicle stability and braking efficiency after recovering from a skid by quickly increasing the wheel cylinder pressure to an appropriate level.

2. Prior art

As shown in FIG. 9, the brake control circuit in a conventional antilock brake control apparatus has a normally-open pressurization valve 3 between the master cylinder 1 and the wheel cylinder 2, a normally-closed depressurization valve 4 and pump 5 in the return channel between the wheel cylinder 2 and the master cylinder 1, and a buffer chamber 6.

When a wheel locking symptom is detected with this antilock brake control apparatus, the pressurization valve 3 is closed and the depressurization valve 4 is opened to reduce the wheel cylinder 2 pressure.

When the locking symptom is overcome, the depressurization valve 4 is again closed. When the wheel speed stabilizes and the wheel speed and estimated vehicle speed are approximately equal, the pressurization valve 3 is opened and closed at a regular pulse to gradually increase the pressure of the wheel cylinder 2 to the master cylinder 1 pressure and thus reduce the pressure difference between the pressure of the master cylinder 1 and wheel cylinder 2. If the brake pressure again increases such that a locking symptom is again detected, the same antilock brake control cycle is repeated.

As shown in FIG. 10, however, the depressurization characteristics of the wheel cylinder pressure in this antilock brake control apparatus have a non-linear curve, and the depressurization time $\Delta T$ must be varied according to the pressure of the wheel cylinder to obtain an amount of desired depressurization level, i.e., the depressurization time required to obtain an amount of desired depressurization level $\Delta P1$ increases as the wheel cylinder pressure level decreases. More specifically, depressurization time $\Delta T2$ starting at a lower pressure and a certain period after depressurization begins is longer than the initial depressurization time $\Delta T1$, which starts at a higher wheel cylinder pressure and results in the same decrease in wheel cylinder pressure (an amount of depressurization $\Delta P1$).

Focusing on the proportional relationship between the wheel cylinder pressure and the acceleration or deceleration of the vehicle, methods have been proposed for estimating the wheel cylinder pressure according to the acceleration or deceleration of the vehicle, and obtaining the appropriate depressurization rate by adjusting the depressurization time based on the estimated wheel cylinder pressure.

If the pressure difference between the master cylinder 1 and the wheel cylinder 2 during pressurization is low in this conventional antilock brake control apparatus, however, the rate of increase in the wheel cylinder 2 pressure caused by the pulse-like opening/closing of the pressurization valve 3 will be slow. It will therefore take even longer for the wheel cylinder 2 pressure to become approximately equal to the master cylinder 1 pressure, leading to reduced brake efficiency. On the other hand, if the between difference the master cylinder 1 pressure and wheel cylinder 2 pressure is large, the increase in the wheel cylinder 2 pressure with each opening of the pressurization valve 3 will also be large, making it more likely for a locking symptom to develop again and reducing vehicle stability and control.

In addition, because the wheel cylinder pressure is estimated from the vehicle acceleration/deceleration, there is a delay until the vehicle acceleration/deceleration reaches a level corresponding to the new coefficient of friction $\mu$ when the friction coefficient $\mu$ of the road surface changes suddenly during depressurization. High precision control and even obtaining the desired depressurization rate can then be very difficult.

SUMMARY OF THE INVENTION

Therefore, an object of the present invention is to improve brake efficiency and control the depressurization and pressurization rate with high precision by means of an apparatus for applying appropriate depressurization at the desired depressurization rate after a locking symptom is detected, slow pressurization and rapid pressurization at the desired pressurization rate immediately after recovery, and rapidly increasing the wheel cylinder pressure to an appropriate level after skid recovery.

An antilock brake control apparatus according to the present invention comprises a wheel speed detection means for detecting a wheel speed of each wheel; a behavior calculation means for calculating wheel behavior data including speed, acceleration and deceleration of each wheel, and for calculating vehicle behavior data including an estimated vehicle speed, an estimated vehicle acceleration and estimated vehicle deceleration based on the detected wheel speed; a locking symptom detection means for detecting a wheel locking symptom and a removal of wheel locking symptom based on the wheel behavior data and the vehicle behavior data; a depressurization signal setting means for producing a depressurization signal in response to the detection of the wheel locking symptom until the removal of the wheel locking symptom, said depressurization signal determined by the wheel behavior data and the vehicle behavior data; a pressure difference calculation means for calculating, after a locking symptom is detected, a pressure difference between the current wheel cylinder pressure and the wheel cylinder pressure when a locking symptom is first detected to obtain a maximum pressure difference at a time when the removal of the wheel locking symptom is detected: a synchronization detection means for detecting a synchronous state established when a difference between the wheel speed and the estimated vehicle speed is within a predetermined range, and an asynchronous state established when said difference is more than said predetermined range; a slow pressurization signal setting means for producing a slow pressurization signal in response to the removal of the wheel locking symptom and during the asynchronous state; and a rapid pressurization signal setting means for producing a rapid pressurization signal in response to the establishment of said synchronous state and until the wheel cylinder pressure is increased to gain a predetermined percentage of said maximum pressure difference.

Synchronization of the wheel speed and the estimated vehicle speed above and in the description below refers to that state in which the wheel speed and estimated vehicle speed are nearly equal or are rapidly approaching equality. This state may be evaluated by applying the formula $$d/dt(SPEED) \geq 5\ g$$

where SPEED is the wheel speed and g is the acceleration of gravity, or by applying the formula $$VREF - SPEED \leq VREF/32 + 2\ (kph)$$

where VREF is the estimated vehicle speed and SPEED is again the wheel speed.

The preferred type of depressurization and pressurization actuator is a variable flow control valve, while a solenoid valve with on/off states can also be used.

When the locking symptom detection means detects a symptom of wheel locking, the depressurization signal setting means drives the depressurization actuator by means of a depressurization signal set according to the wheel speed or other parameters to reduce the wheel cylinder pressure at an appropriate depressurization rate.

When there is a significant difference between the wheel speed and the estimated vehicle speed (an asynchronous state) after the locking symptom is removed, the pressurization actuator is driven by an appropriate slow pressurization signal generated by the pressurization signal setting means from the estimated vehicle speed or other parameters based on the friction coefficient $\mu$ of the road surface.

When the wheel speed and estimated vehicle speed are nearly equal and synchronized (the above synchronization condition is established), the pressurization actuator is driven by an appropriate rapid pressurization signal based, for example, on the wheel speed to rapidly increase the wheel cylinder pressure to approximately the pressure calculated by the pressure difference calculation means when locking symptom was first detected.

When variable flow control valves are used for the pressurization and depressurization actuators, the desired pressure and pressurization rate can be maintained with constantly high precision because the actuators are not affected by the pressure of the wheel cylinder and the master cylinder.

BRIEF DESCRIPTION OF THE DRAWINGS

The present invention will become more fully understood from the detailed description given below and the accompanying diagrams wherein:

FIG. 1 is a block diagram of the circuit lines in an antilock brake control apparatus according to the first embodiment of the invention.

DESCRIPTION OF PREFERRED EMBODIMENTS

The preferred embodiments of the present invention are described below with reference to the accompanying figures.

Figure 2A:
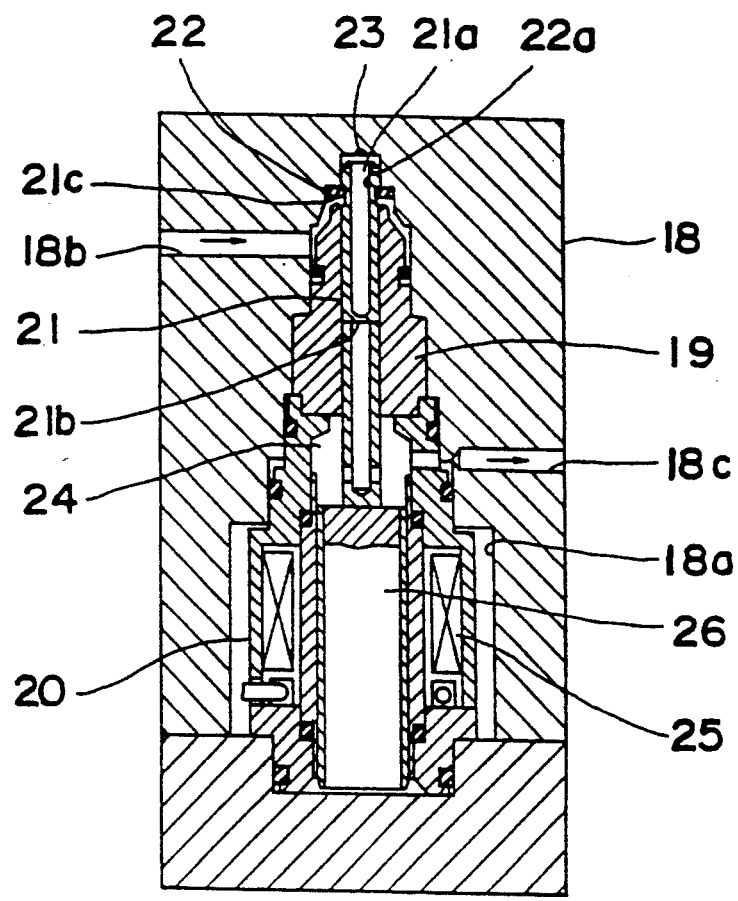
FIGS. 2a, 2b and 2c is a cross sectional diagram of a variable flow control valve used for the pressurization and depressurization actuators of the invention.
Figure 2B:
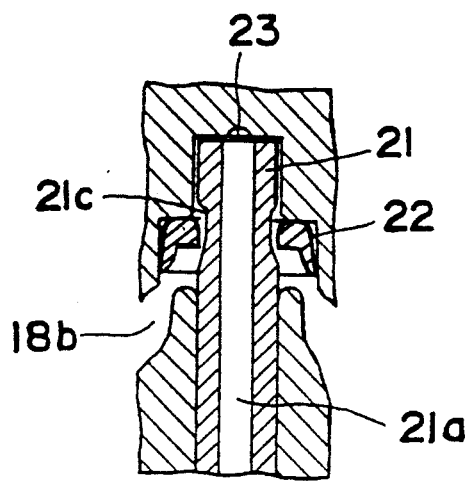
Figure 2C:
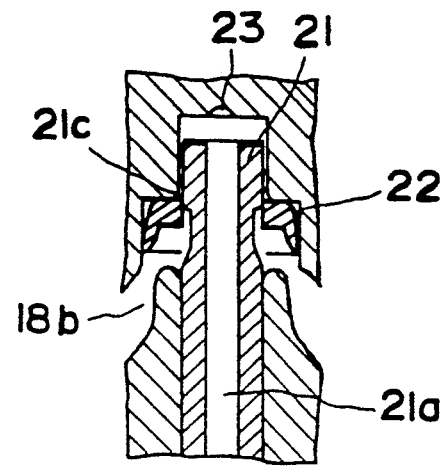
Figure 3:
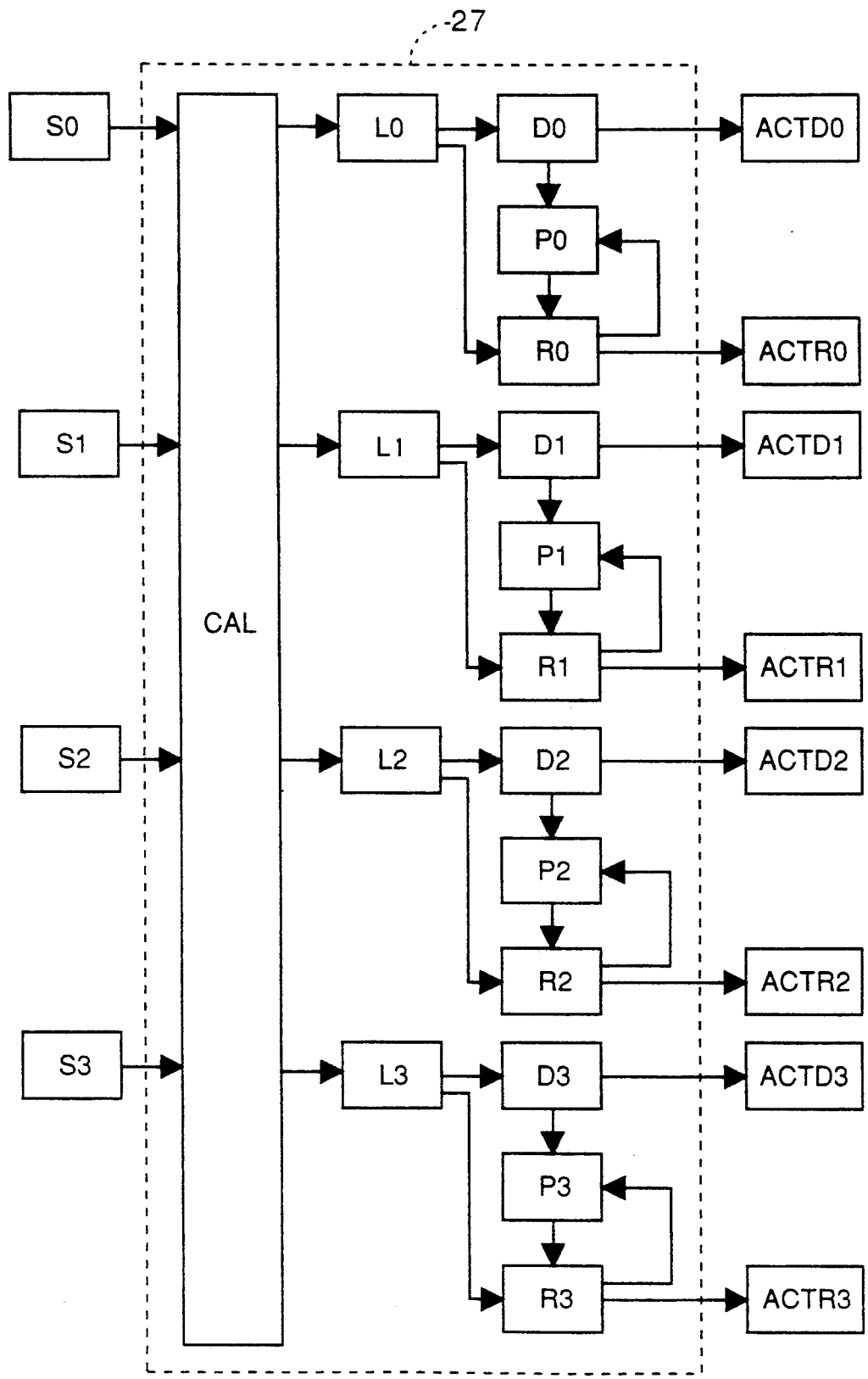
FIG. 3 is a block diagram of the signal processor in the first embodiment of the invention, FIGS. 4 and 5 taken together show a flow chart of the operation of the first embodiment of the invention.

The first embodiment of the invention as shown in FIGS. 1, 2, and 3 comprises four pressurization actuators ACTR0, ACTR1, ACTR2, and ACTR3 between the master cylinder 11 and each of four wheel cylinders 12A, 12B, 12C, and 12D for the left-front, right-front, left-rear and right-rear wheels, respectively, and four depressurization actuators ACTD0, ACTD1, ACTD2, and ACTD3 between each of the four wheel cylinders 12A, 12B, 12C and 12D and a motor pump 15 which is in turn connected through conduit 16 to the master cylinder 11. A buffer chamber 17 is also provided in the conduit extending from the depressurization actuators ACTD0-ACTD3.

The pressurization actuators ACTR0-ACTR3 are used for increasing the braking pressure in the corresponding wheel cylinder 12 and depressurization actuators ACT0-ACTD3 are used for decreasing the braking pressure. Each of the actuators ACTR0-ACTR3 and ACTD0-ACTD3 comprises a variable flow control valve which is shown in FIGS. 2a, 2b and 2c. The variable flow control valves are driven by the pressurization signal or depressurization signal from the respective depressurization signal setting means D0, D1, D2, and D3 or pressurization signal setting means R0, R1, R2, and R3 to decrease or increase the wheel cylinder 12 pressure. In this first embodiment of the invention, the pressurization actuators ACTR0-ACTR3 are normally open valves, and the depressurization actuators ACTD0-ACTD3 are normally closed valves.

Referring to FIG. 2a, the specific construction of the variable flow control valve is shown. The housing 18 has an axial shaft 18a and an input port 18b and output port 18c provided radially and through to the shaft 18a. A sleeve 19 is provided at the input port 18b of the shaft 18a, and a frame 20 at the output port 18c.

A spool 21, having a brake fluid channel 21a parallel to the long axis and an orifice 21b in the middle, is inserted in the sleeve 19 in a manner allowing the spool 21 to slide freely in the sleeve 19.

The ring seal 22 is provided with the outside circumference of the ring seal 22 in contact with the inside of the shaft 18a. When the spool 21 is moved to a lifted position, shown in FIG. 2b, an outside edge 21c of the spool 21 moves away from the ring seal 22 so that the input port 18b is open to the brake fluid channel 21a through the outside channel and the upper chamber 23 at the top of the spool 21. When the spool 21 is moved to a descended position, shown in FIG. 2c, the outside edge 21c of the spool 21 contacts the ring seal 22 so that the input port 18b is cut off from the brake fluid channel 21a.

A lower chamber 24, open to the brake fluid channel 21a and the output port 18c, is provided in the frame 20 with an electromagnet 25 at the bottom of the lower chamber 24. The armature 26 of the electromagnet 25 drives the spool 21 up. It should be noted that the lifting force applied to the spool 21 can be freely adjusted by varying the current supplied to the electromagnet 25 according to the pressurization signal or depressurization signal. This operation will be described in detail below.

When the parameters are given as follows:
pressure of input port 18b:P1,
pressure of upper chamber 23:P2,
pressure of output port 18c:P3,
force of the armature 26:F, and
cross section area of the spool 21:S, the relationship $$P2 = P3 + F/S$$

is maintained by moving the spool 21 up or down to open or close the working fluid flow by appropriately positioning the ring seal 22. The pressure difference before and after the orifice 21b is therefore maintained at F/S irrespective of the input port 18b pressure P1 or the output port 18c pressure P3, and the fluid flow through the orifice 21b is kept constant. As a result, the variable flow control valve thus described can adjust the force F and the amount of fluid flowing through the orifice 21b by changing the current supplied to the electromagnet 25 according to the pressurization and depressurization signals.

Referring to FIG. 3, the wheel speed detection means S0, S1, S2, and S3 detect the speed of the left-front and right-front, left-rear and right-rear wheels, respectively, and provide the detected wheel speed signal to the signal processor 27.

The signal processor 27 is a microcomputer comprising a wheel/vehicle behavior calculation means CAL, locking symptom detection means L0, L1, L2, and L3, depressurization signal setting means D0, D1, D2, and D3, pressure difference signal calculation means P0, P1, P2, and P3, and pressurization signal setting means R0, R1, R2, and R3. The signal processor 27 processes the wheel speed signals according to a predefined procedure to output the appropriate depressurization or pressurization signals to the depressurization actuators ACTDO–ACTD3 and pressurization actuators ACTRO–ACTR3.

The wheel/vehicle behavior calculation means CAL calculates the wheel speed and wheel acceleration/deceleration of each wheel based on the wheel speed signals output from the wheel speed detection means S0–S3, and estimates the speed and acceleration/deceleration of the vehicle to obtain the estimated vehicle speed and estimated vehicle acceleration/deceleration, by applying a known method.

The wheel/vehicle behavior calculation means CAL also compares each of the wheel speeds with the estimated vehicle speed to detect the synchronization condition, as explained below. When the wheel speed of the wheel(s) to which the brake(s) was applied is approximately equal to the estimated vehicle speed, the wheel speed and estimated vehicle speed are determined to be in a synchronous state. However, when there is a significant difference between the wheel speed and the estimated vehicle speed, they are considered to be in an asynchronous state.

This detection of synchronous/asynchronous states is based on equation (1) below in the first embodiment, $$d/dt(SPEED) \geq 5 \, g \quad (1)$$

wherein SPEED is the wheel speed and g is the acceleration of gravity.

When a synchronous state is detected based on equation (1), a flag (sync flag) indicating the synchronization state is cleared to 0 to indicate a synchronous state. When an asynchronous state is detected, the sync flag is set to 1.

The locking symptom detection means L0–L3 detect the presence of any locking symptoms for the respective wheels based on the speed and acceleration/deceleration of each wheel and the estimated vehicle speed and estimated vehicle acceleration/deceleration, and set the sync flags.

The locking symptom detection means L0–L3 uses equation (2) to evaluate the presence of locking symptom at each wheel.

$$VREF - SPEED \geq 4 + VREF/32 \text{ (kph)}$$

and $$d/dt(SPEED) \leq -1.5 \, g \quad (2)$$

wherein VREF is the estimated vehicle speed and g is the acceleration of gravity.

The depressurization signal setting means D0–D3 determine a depressurization-required state based on the signals from the locking symptom detection means L0–L3 when the corresponding locking symptom detection means L0–L3 detects a locking symptom in the corresponding wheel, and sets a depressurization signal DS controlling the depressurization rate based on the signal from the wheel/vehicle behavior calculation means CAL.

In the first embodiment of the invention, the depressurization signal DS is varied according to the wheel behavior by applying equation (3) below.

$$DS = \{(d^2/dt^2)SPEED_{(g/control \, cycle \, time)} + (d/dt)SPEED_{(g)}\} \times 100_{(bar/s)} \quad (3)$$

wherein the minimum possible value of DS is 0.

The pressurization signal setting means R0–R3 determine a pressurization-required state based on the signals from the locking symptom detection means L0–L3 when the corresponding locking symptom detection means L0–L3 does not detect a locking symptom in the corresponding wheel, i.e., when the locking symptom has been removed, and sets a pressurization signal PS controlling the pressurization rate based on the signals from the wheel/vehicle behavior calculation means CAL and the corresponding pressure difference signal calculation means P0–P3. The pressurization signal setting means R0–R3 vary the pressurization rate controlled by the pressurization signal according to whether a synchronous state exists or not.

The pressurization signal setting means R0–R3 output a slow pressurization signal RS1 setting a slow pressurization rate when an asynchronous state is detected by the locking symptom detection means L0–L3, i.e., when there is a significant difference between the wheel speed of the wheel to which the brakes are applied and the estimated vehicle speed. The pressurization rate is set by first estimating the friction coefficient $\mu$ of the road surface based on the estimated vehicle acceleration/deceleration calculated by the wheel/vehicle behavior calculation means CAL, and then setting the pressurization rate according to this estimated coefficient of friction $\mu$. A device for obtaining the estimated coefficient of friction $\mu$ is disclosed fully in U.S. Pat. No. 4,693,522 issued Sept. 15, 1987 and entitled "PROCESS AND CIRCUIT ARRANGEMENT FOR ADAPTING SLIP CONTROL TO THE MOMENTARY FRIC- TION VALUE" and the disclosure thereof is considered to be a part of this application.

In the first embodiment of the invention, the coefficient of friction $\mu$ is divided into three levels as shown in Table 1, and the slow pressurization rate is variable according to the current coefficient of friction $\mu$ level.

TABLE 1

| Coefficient of friction ($\mu$) | Slow pressurization rate (bar/s) |
| --- | --- |
| $\mu \leq 0.1$ | 40 |
| $0.1 < \mu \leq 0.5$ | 80 |
| $\mu > 0.5$ | 120 |

The pressurization signal setting means R0–R3 output a rapid pressurization signal RS2 setting a rapid pressurization rate when a synchronous state is detected by the wheel/vehicle behavior calculation means CAL, i.e., when the wheel speed of the wheel to which the brakes are applied and the estimated vehicle speed are approximately equal. The pressurization rate is set according to the wheel recovery, specifically by applying equation (4) to determine the rapid pressurization signal RS2 in the first embodiment.

$$RS2 = (d/dt)SPEED_{(g)} \times 100_{(bar/s)} \quad (4)$$

where RS2 takes the minimum of 400 and the maximum of 1000.

The pressurization signal setting means R0–R3 sets the rapid pressurization signal RS2 when a locking symptom is removed and, at the same time, the synchronous state exists. By the rapid pressurization signal RS2, the pressure in the wheel cylinders 12A–12D can be quickly raised to approximately equal an optimum pressure level (the optimum pressure approximation level). In the first embodiment, the pressure in the wheel cylinders 12A–12D is increased to 80% of the maximum (maximum relative pressure $\Delta P$max) difference (relative pressure) between the current pressure of the wheel cylinder 12 and the pressure of the wheel cylinder 12 obtained when the locking symptom was detected. This difference is calculated by the pressure difference signal calculation means P0–P3 during the period between the detection and removal of the locking symptom.

The pressure difference signal calculation means P0–P3 calculate the relative pressure $\Delta P$ which is a pressure difference between the current pressure of the wheel cylinder 12 and the pressure of the wheel cylinder 12 when the locking symptom was detected, and such a calculation is carried out using the depressurization signal DS, slow pressurization signal RS1, and rapid pressurization signal RS2 as indicated in equation (5) below.

Specifically, the depressurization rate when a locking symptom is detected is obtained from equation (3), the pressurization rate applied for slow pressurization during the asynchronous state after the locking symptom is removed is obtained by Table 1, the rapid pressurization rate used when a synchronous state is restored after the locking symptom is removed is obtained from equation (4), and both the depressurization rate and pressurization rate can thus be known.

The relative pressure $\Delta P$ can thus be obtained by applying these known quantities in equation (5).

$$\Delta P = \Delta DS(t)dt - \Delta RS1(t)dt - \Delta RS2(t)dt \quad (5)$$

The pressure difference signal calculation means P0–P3 also stores and holds the maximum $\Delta P$max of the relative pressure $\Delta P$ from a time when the locking symptom is detected until a synchronous state is established again. The pressure of the wheel cylinder 12 increases nearly equal to the pressure PD, which is the pressure of the wheel cylinder 12 obtained when the locking symptom was detected (i.e., to the optimum pressure approximation level), during rapid pressurization after the synchronous state condition is again established.

The signal processor 27 also comprises a depressurization timer TD and a pressurization timer TR (not shown in FIG. 3).

When a locking symptom is detected, the depressurization timer TD counts the depressurization time to the maximum of 255 by, for example, looping through an incrementing loop defining TD=TD+1. The depressurization timer TD is cleared to TD=0 when the sync flag changes from 0 to 1.

When no locking symptom is detected, the pressurization timer TR counts the pressurization time to the maximum of 255 by, for example, looping through an incrementing loop defining TR=TR+1. The pressurization timer TR is cleared to TR=0 when a locking symptom is detected.

The operation of the signal processor 27 is described below with reference to the flow charts in FIGS. 4–6.

It is to be noted that the following description is limited to a single wheel for simplicity, and the same operation is assumed to be applied to the other wheels. Furthermore, the enumerator "i" in these flow charts is a value of 0, 1, 2, or 3 representing left-front, right-front, left-rear and right-rear wheels. For example, Li may be any one of the four locking symptom detection means L0, L1, L2, or L3.

Figure 4:
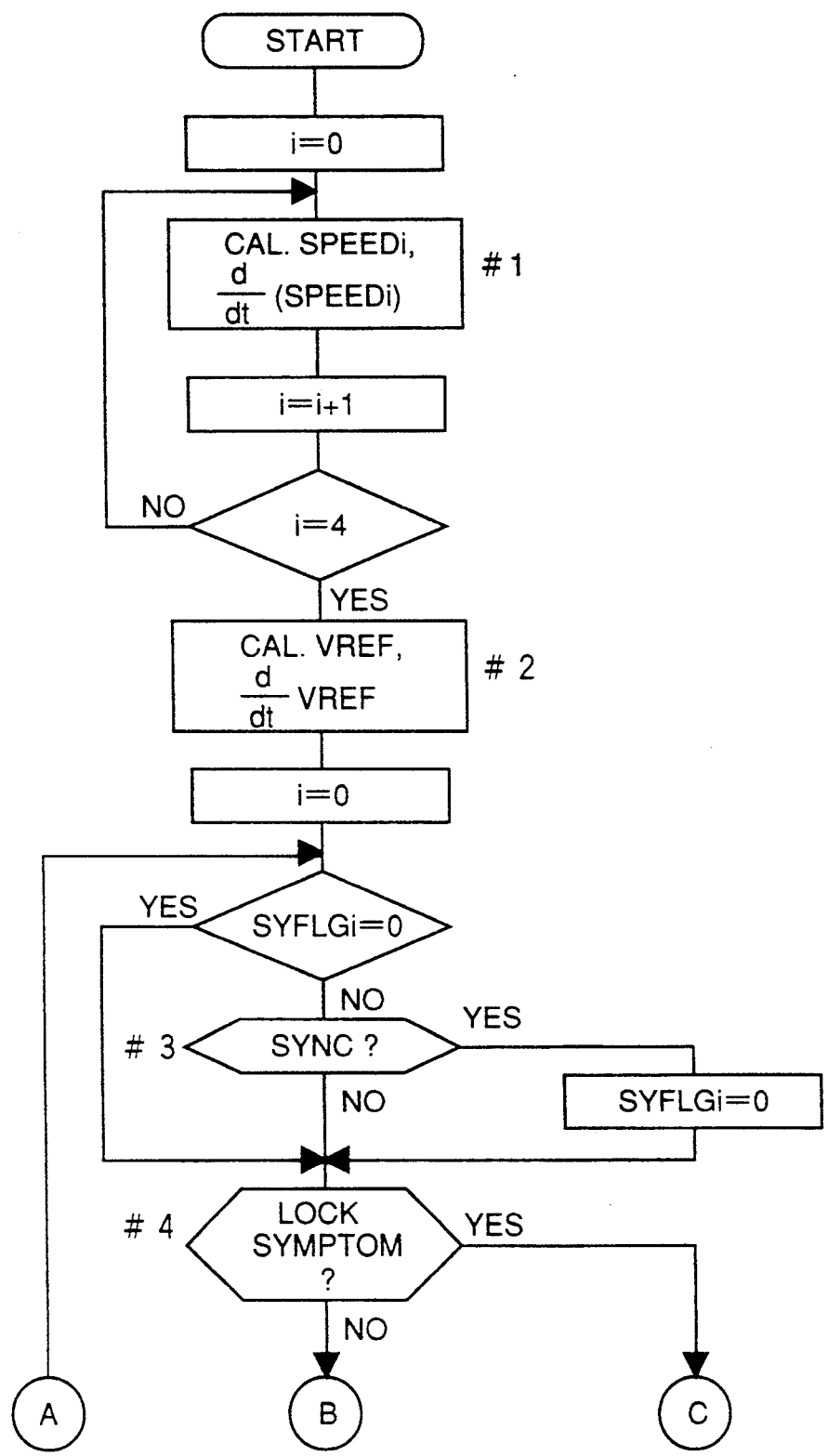
Figure 5:
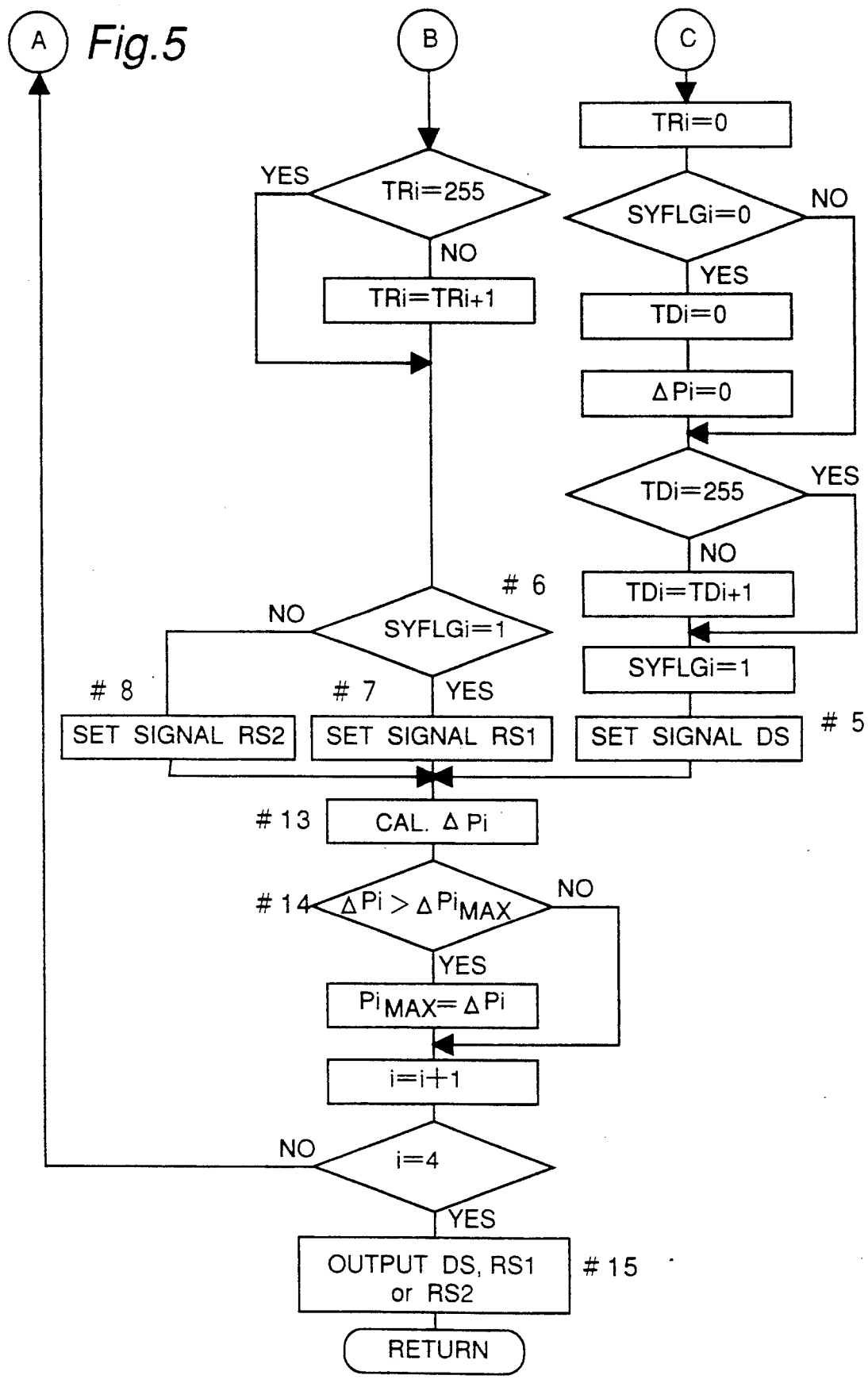
Figure 6:
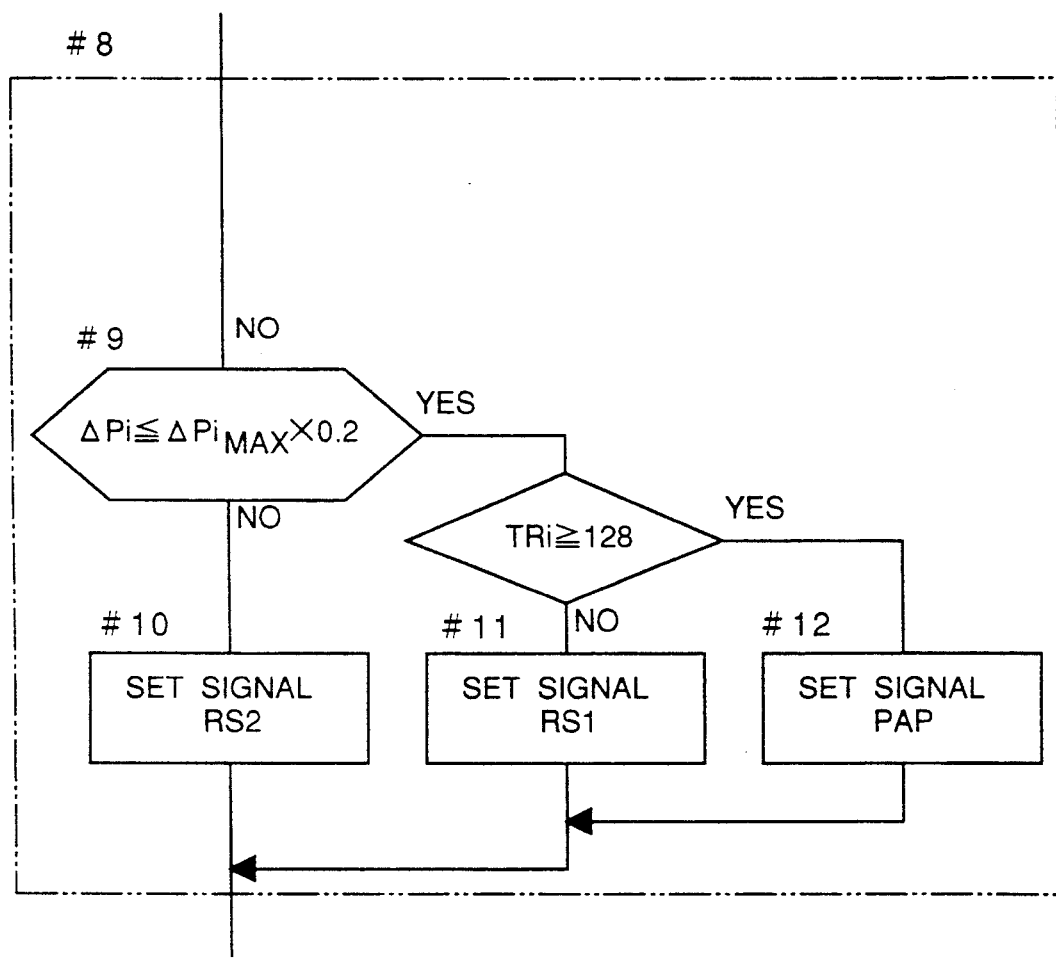
FIG. 6 is a detailed flow chart of the subroutine executed to set the rapid pressurization signal in the first embodiment of the invention.

Referring first to FIGS. 4 and 5, the procedure starts by initializing the wheel identification enumerator i to the current wheel (i=0 in this example). The wheel speed and wheel acceleration/deceleration are then calculated by the wheel/vehicle behavior calculation means CAL based on the wheel speed detection signal output by the wheel speed detection means Si (step #1). This is repeated for each of the wheels, and the estimated vehicle speed VREF and vehicle acceleration/deceleration (i.e., the estimated vehicle acceleration/deceleration) are then calculated based on the wheel acceleration/deceleration or other parameters (step #2).

The wheel variable is then reinitialized and the sync flag SYFLGi is detected. If SYFLGi=1, it is further detected whether or not the synchronous state condition is established for the current wheel. If the synchronous state condition is established, the sync flag SYFLGi is cleared to 0. If SYFLGi=0, or if SYFLGi=1 and at the same time if synchronous state is not yet established, the procedure advances to step #4.

The locking symptom detection means Li now looks for any locking symptoms in the current wheel by applying equation (2) above.

If a locking symptom is detected, the pressurization timer TRi is initialized to 0. If the sync flag SYFLGi was cleared (=0) in the previous control cycle, the current control cycle is determined to be the locking symptom detection edge, and the depressurization timer TDi and relative pressure $\Delta P$i are both cleared (=0). If the depressurization timer TDi has not been incremented to the maximum (255) count, it is incremented by one, and the sync flag SYFLGi is set (=1). The depressurization signal setting means Di then sets the depressurization signal DS according to equation (3).

If, however, a locking symptom was not detected at step #4, the pressurization timer TRi is incremented one if it is not equal to the maximum count (255). The sync flag SYFLGi is then checked at step #6.

If the sync flag SYFLGi is set (=1), an asynchronous state exists and the pressurization signal setting means Ri therefore sets the slow pressurization signal RS1 based on Table 1 above (step #7).

If the sync flag SYFLGi is cleared (=0), however, the rapid pressurization signal RS2 is set (step #8) as described below with reference to FIG. 6.

The first step in this routine is to compare the relative pressure $\Delta Pi$ with the value equal to 20% of the maximum relative pressure $\Delta Pimax$ (step #9). If the relative pressure $\Delta Pi$ is greater than this value, the pressurization signal setting means Ri sets the rapid pressurization signal RS2 (step #10).

If the relative pressure $\Delta Pi$ is less than or equal to 20% of the maximum relative pressure $\Delta Pimax$ (step #9), however, the relative pressure $\Delta Pi$ has approached the maximum relative pressure $\Delta Pimax$ and the pressure of wheel cylinder 12 is approximately equal to the optimum pressure level. The pressurization signal setting means therefore sets either the slow pressurization signal RS1 (step #11) or a post-antilock pressurization signal PAP after antilock brake control has ended (step #12) according to the pressurization time of the pressurization timer TRi.

From steps #5, #7, and #8 the control procedure advances to calculation of the relative pressure $\Delta Pi$. The relative pressure $\Delta Pi$ is calculated by the pressure difference signal calculation means Pi based on the slow pressurization signal RS1 and rapid pressurization signal RS2 from the pressurization signal setting means Ri, and the depressurization signal DS from the depressurization signal setting means Di (step #13).

The relative pressure $\Delta Pi$ thus calculated is then compared with the maximum relative pressure $\Delta Pimax$ (step #14), and the relative pressure $\Delta Pi$ is substituted for the maximum relative pressure $\Delta Pimax$ if the relative pressure $\Delta Pi$ is greater.

The above sequence from step #1 to step #14 is repeated for each of the values i=0 to i=3, i.e., for each of the four wheels. Control then advances to output the specified depressurization signal DS, slow pressurization signal RS1, or rapid pressurization signal RS2 to the depressurization actuator ACTD0–ACTD3 or pressurization actuator ACTR0–ACTR3 of each wheel (step #15). This output completes one control cycle.

Figure 7:
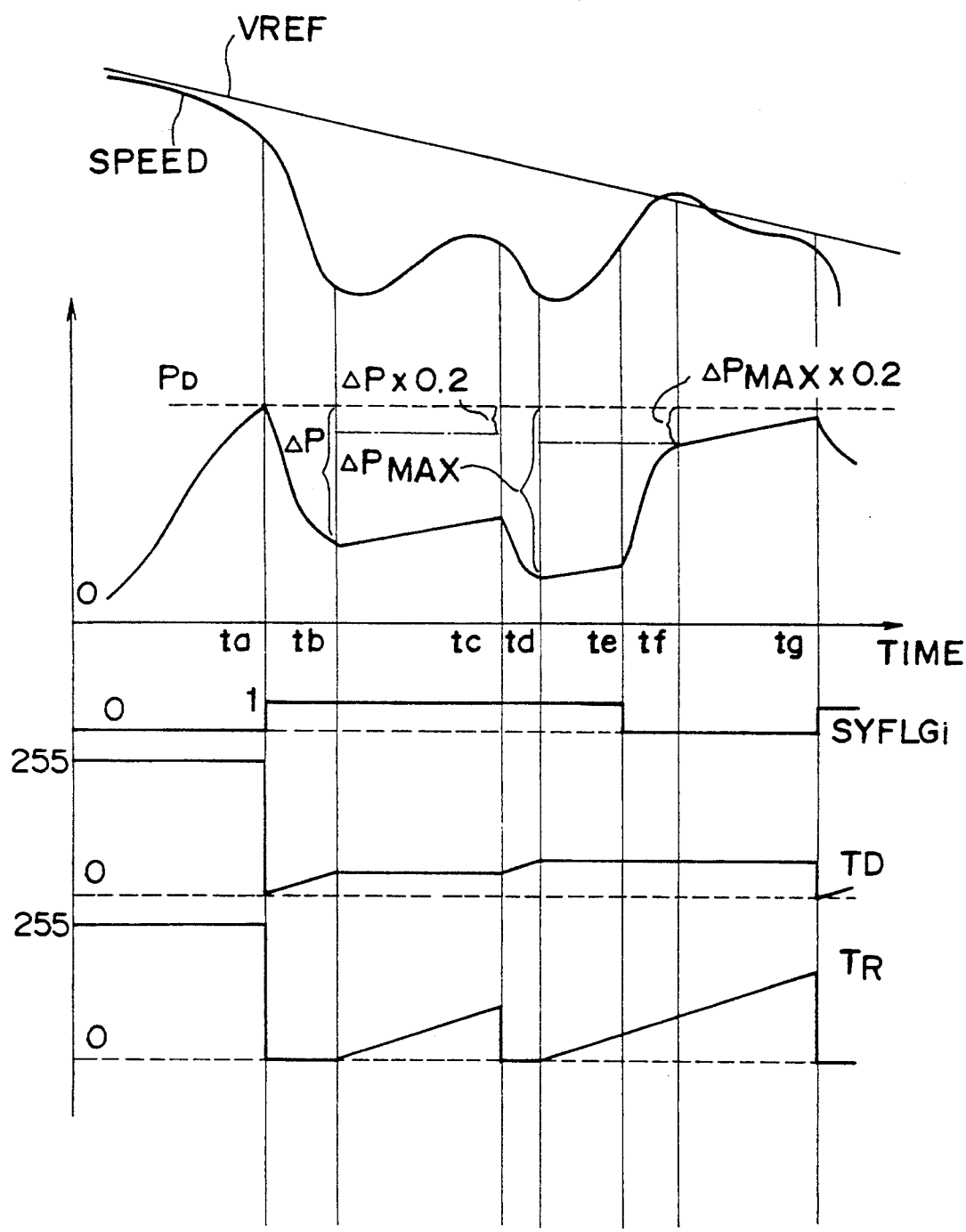
FIG. 7 is a graph used to describe the control sequence of the first embodiment of the invention.

FIG. 7 is a waveform diagram used to describe the specific antilock brake control operation of the first embodiment.

It is herein assumed that a locking symptom is detected at time $t_a$, and the sync flag SYFLGi is set (=1).

A depressurization is carried out during the time $t_a$–$t_b$. Thus, the depressurization signal DS is set, and the depressurization time counted by the depressurization timer TDi is recorded. High precision depressurization control is possible with the present invention even when there is a sudden change in the friction coefficient $\mu$ of the road surface because depressurization is effected by a depressurization actuator ACTDi comprising a variable flow control valve based on a depressurization signal DS reflecting the vehicle acceleration/deceleration. At time $t_b$, the lock symptom is removed.

A pressurization is carried out during $t_b$–$t_c$, but an asynchronous state (sync flag SYFLGi=1) still exists. The slow pressurization signal RS1 is therefore set, and the pressurization time counted by the pressurization timer TRi is recorded. Note that the depressurization time as counted by timer TDi during $t_a$–$t_b$ is suspended during this time. At time $t_c$, a locking symptom is detected again.

The depressurization is again carried out during $t_c$–$t_d$ in the same manner as that carried out during $t_2$–$t_b$, and the depressurization time during this period is counted by timer TDi cumulatively to the depressurization time counted during $t_a$–$t_b$. At time $t_d$, the lock symptom is removed.

The slow pressurization is again carried out during $t_d$–$t_e$ in the same manner as that carried out during $t_b$–$t_c$, and the pressurization time during this period is counted by timer TRi.

At time $t_e$, the synchronous state condition is established so that the sync flag SYFLGi is cleared (=0), and rapid pressurization occurs. As stated above, rapid pressurization continues until the relative pressure $\Delta Pi$ reaches 20% of the maximum relative pressure $\Delta Pimax$ during the period an asynchronous state continues, i.e., until the wheel cylinder pressure reaches 80% of the wheel cylinder pressure when a locking symptom was detected (the locking symptom detection pressure PD).

In FIG. 7 the maximum relative pressure $\Delta Pimax$ occurs at time $t_d$, and can be calculated based on the following derivative equation (6) of equation (5).

$$\Delta P = \int_a^b DS(t)dt - \int_b^c RS1(t)dt - \int_c^d DS(t)dt \quad (6)$$

A locking symptom is again detected at time $t_g$, the depressurization timer TDi is cleared starts counting, and the sync flag SYFLGi is set (=1).

Thus, because the depressurization rate and pressurization rate are known and the depressurization time and pressurization time in the depressurization and pressurization processes are recorded by the depressurization timer TDi and pressurization timer TRi, the pressure difference relative to the locking symptom detection pressure PD (the relative pressure) is recorded between locking symptom detection and recovery of a synchronous state. In addition, the wheel cylinder pressure can be quickly increased by rapid pressurization to approximately the locking symptom detection pressure PD based on this maximum relative pressure after a synchronous state is recovered. As a result, vehicle stability can be maintained, and braking efficiency can be improved.

Figure 8:
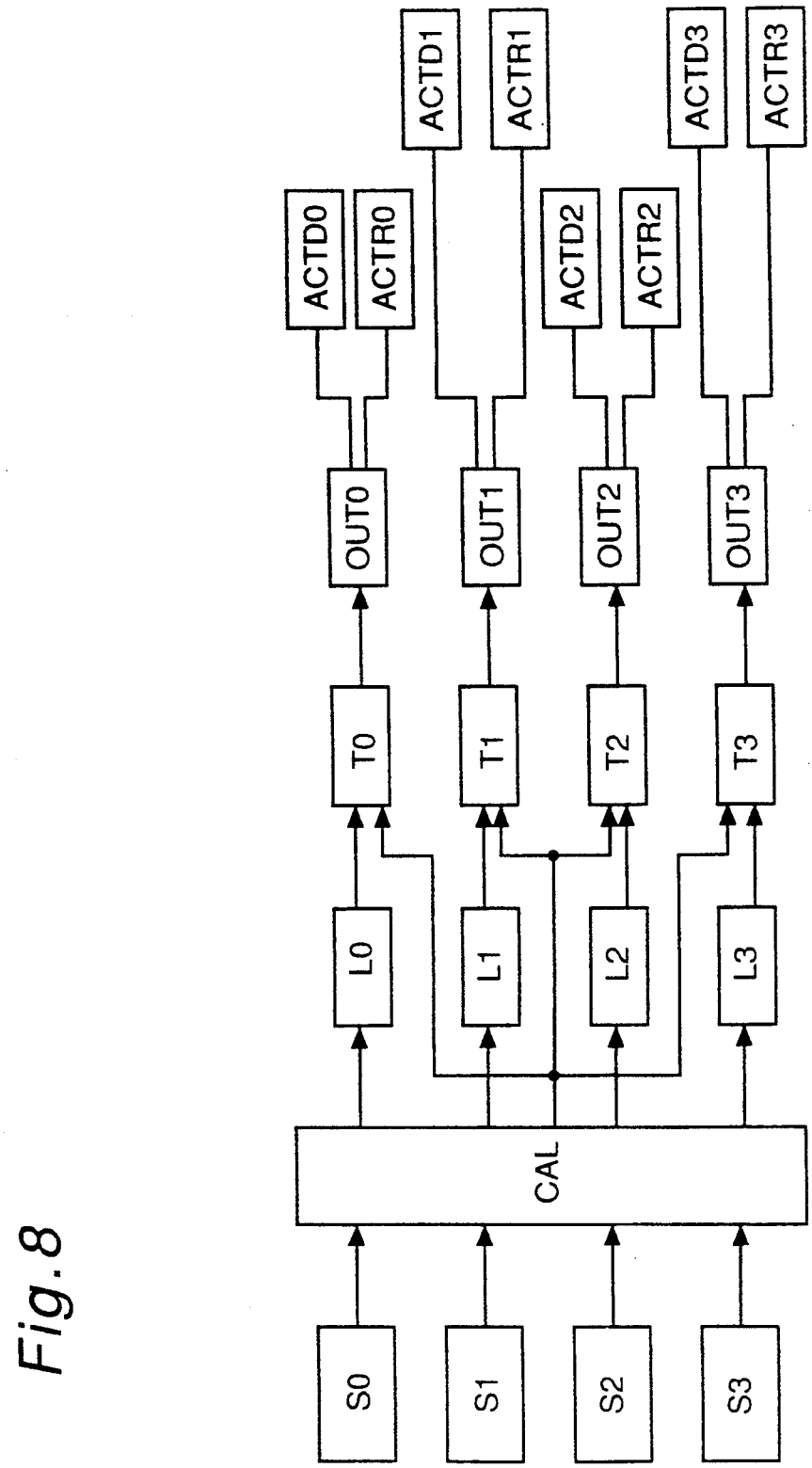
FIG. 8 is a block diagram of a second embodiment of the invention.
Figure 9:
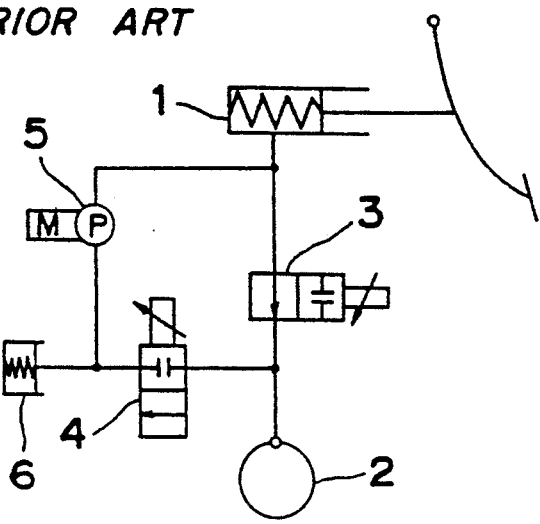
FIG. 9 is a block diagram of a conventional antilock brake control apparatus.
Figure 10:
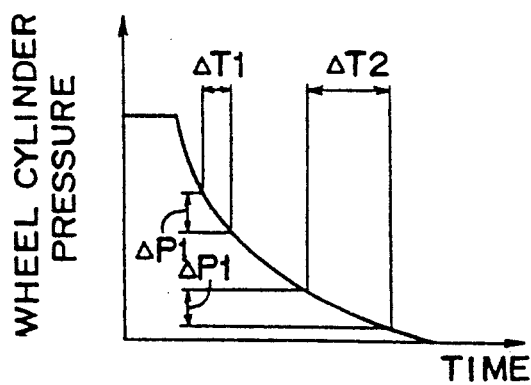
FIG. 10 is a graph of the depressurization characteristics of a conventional antilock brake control apparatus.

FIG. 8 is a block diagram of an antilock brake control apparatus according to a second embodiment of the invention. The connection lines in this embodiment are the same as in the first embodiment above, but solenoid valves are used for the pressurization actuators ACTR0–ACTR3 and depressurization actuators and ACTD0–ACTD3.

In addition, the depressurization signal DS and pressurization signals RS1 and RS2 are set according to a specified pressurization/depressurization rate as in the first embodiment.

The wheel/vehicle behavior calculation means CAL calculates the estimated vehicle acceleration/deceleration, sets a compensation variable $\alpha$ according to the wheel cylinder pressure estimated from this estimated vehicle acceleration/deceleration, and corrects the depressurization signal DS using this compensation variable $\alpha$ to set the depressurization solenoid opening coefficient J.

However, while it is necessary to obtain the pressure level of the master cylinder in order to set the opening signal of the pressurization actuators ACTR0-ACTR3 applying the pressurization signals RS1 and RS2, it is not possible to obtain the master cylinder pressure directly from the wheel behavior.

A learning compensation using the amount of time (the sync timer SYTMRi value) required from the start of rapid pressurization to the removal of the locking symptom is therefore used in this second embodiment. A pressurization compensation variable $\beta$ thus obtained is used to correct the pressurization signals RS1 and RS2 and set the pressurization solenoid opening coefficient K.

The method of the learning compensation is described below.

Specifically, when the sync timer SYTMRi value is high (e.g., SYTMRi$\geq$50), it can be assumed that the pressurization rate during the immediately preceding skid cycle (each locking symptom detection cycle during the synchronous state) was too slow rather than being appropriate. The compensation variable $\beta$ is therefore incremented to $\beta = \beta + 1$ to increase the pressurization rate in the next skid cycle.

If the sync timer SYTMRi value is appropriate (e.g., 20$\leq$SYTMRi$\leq$50), the wheel cylinder pressure is increasing at an appropriate rate and there is no need to adjust the compensation variable $\beta$.

If the sync timer SYTMRi value is low (e.g., SYTMRi<20), it can be assumed that the pressurization rate during the immediately preceding skid cycle was too fast. The compensation variable $\beta$ is therefore decremented to $\beta = \beta - 1$ to decrease the pressurization rate in the next skid cycle.

The pressurization/depressurization time setting means T0, T1, T2, and T3 set the opening/closing time of the solenoid valves of the depressurization actuators and ACTD0-ACTD3 or pressurization actuators ACTR0-ACTR3 based on the solenoid opening coefficients J and K. Based on this opening/closing time, the solenoid command outputs OUT0, OUT1, OUT2, and OUT3 output the drive commands to the depressurization actuators and ACTD0-ACTD3 or pressurization actuators ACTR0-ACTR3.

This construction makes it possible to maintain the desired pressurization/depressurization rate even when the wheel cylinder pressure changes.

As a result, the pressure difference (relative pressure $\Delta P'$) to the locking symptom detection pressure PD can be expressed by equation (5) as used in the first embodiment described above.

In the second embodiment the relative pressure $\Delta P'$ is calculated each control cycle as in the first embodiment, the maximum is recorded as the maximum relative pressure $\Delta P'$max, and rapid pressurization is applied when the synchronous state condition is established using the value (PD$-$(0.2$\times \Delta P'$max)) as the optimum target pressure for pressurization.

The rapid pressurization rate is likewise obtained from equation (4), and the rapid pressurization signal RS2 corresponding to this rate is corrected with the compensation variable $\beta$, and applied for rapid pressurization control. Because rapid wheel cylinder pressurization is used after a synchronous state is restored in this second embodiment as in the first embodiment, braking efficiency can be improved, and loss of vehicle stability and steering control resulting from easy skidding due to an excessive increase in the wheel cylinder pressure can be prevented.

It is to be noted that the present invention shall not be limited as described above, and there are many possible variations.

For example, the following equation $$\text{VREF}-\text{SPEED} \geq 5 + \text{VREF}/2 \text{ (kph)}$$

can be used in addition to equation (2) for the locking symptom detection.

Also, the equation $$\text{VREF}-\text{SPEED} \leq \text{VREF}/32 + 2 \text{ (kph)}$$

may be substituted for equation (1) for detecting the synchronous state.

Note also that the coefficient of friction $\mu$ was estimated from the vehicle acceleration/deceleration calculated by the wheel/vehicle behavior calculation means CAL in the above pressurization evaluation, but it is also possible to provide an acceleration/deceleration sensor to directly measure the vehicle acceleration/deceleration, and measure the coefficient of friction $\mu$ based on this measured value.

In addition, the wheel cylinder pressure is increased by rapid pressurization until the relative pressure $\Delta$Pi is greater than 20% of the maximum relative pressure $\Delta$Pimax, but this value of 20% can be varied by learning, or may set greater than 20% relative to the decrease in the asynchronous-state pressurization time TRi.

Furthermore, an upper limit can be set for the $\Delta$Pmax value as shown in Table 2 according to the coefficient of friction $\mu$ estimated from the deceleration obtained from the wheel/vehicle behavior calculation means CAL or acceleration/deceleration sensors. This upper limit can effectively prevent an excessive increase in the maximum relative pressure $\Delta$Pmax when the depressurization time is long, which is indicative of degree of difficulty to recover from wheel locking.

TABLE 2

| Coefficient of friction ($\mu$) | Max. relative pressure $\Delta$Pmax (bar) |
|---|---|
| $\mu \leq 0.1$ | 20 |
| $0.1 < \mu \leq 0.5$ | 50 |
| $\mu > 0.5$ | 100 |

The set value of $\Delta$Pmax may also vary according to the brake characteristics, and more coefficient of friction $\mu$ levels may also be defined.

As described hereinabove, an antilock brake control apparatus according to the present invention can improve braking efficiency and maintain vehicle stability and steering control without an excessive increase in the wheel cylinder pressure because it is constructed to rapidly increase the wheel cylinder pressure to approximately an optimum pressure level corresponding to the friction coefficient $\mu$ of the road surface based on a maximum pressure relative to the wheel cylinder pressure when a locking symptom was detected, and this rapid pressurization is applied after the locking symptom is removed and the wheel speed and estimated vehicle speed are again synchronized (a synchronous state exists).

The wheel cylinder pressure can also be reduced at an appropriate depressurization rate because the depressurization signal setting means sets the depressurization signal according to the estimated vehicle acceleration/deceleration calculated by the wheel/vehicle behavior calculation means when the locking symptom detection means detects a locking symptom, and the depressurization actuator is driven by this depressurization signal.

An excessive increase in the wheel cylinder pressure can also be prevented because the wheel cylinder pressure is increased at a slow rate based on the friction coefficient $\mu$ of the road surface when the locking symptom is removed and the wheel speed and estimated vehicle speed are not synchronized (an asynchronous state exists).

Moreover, when a variable flow control valve is used as the depressurization actuator, the pressurization and depressurization time do not need to be dependent on the wheel cylinder pressure, and high precision wheel cylinder pressurization and depressurization are therefore possible even when the friction coefficient $\mu$ of the road changes suddenly.

If the antilock brake control apparatus of the invention is constructed to set a maximum pressure level according to the coefficient of friction $\mu$, the wheel cylinder pressure can be efficiently regulated when it is difficult to recover from wheel locking, and braking efficiency can be improved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An antilock brake control apparatus for use in a vehicle comprising:
    a wheel speed detection means for detecting a wheel speed of each wheel;
    a behavior calculation means for calculating wheel behavior data including speed, acceleration and deceleration of each wheel, and for calculating vehicle behavior data including an estimated vehicle speed, an estimated vehicle acceleration and estimated vehicle deceleration based on the detected wheel speed;
    a locking symptom detection means for detecting a wheel locking symptom and a removal of wheel locking symptom based on the wheel behavior data and the vehicle behavior data;
    a depressurization signal setting means for producing a depressurization signal in response to the detection of the wheel locking symptom until the removal of the wheel locking symptom, said depressurization signal determined by the wheel behavior data and the vehicle behavior data;
    a pressure difference calculation means for calculating, after a locking symptom is detected, a pressure difference between the current wheel cylinder pressure and the wheel cylinder pressure when a locking symptom is first detected to obtain a maximum pressure difference at a time when the removal of the wheel locking symptom is detected:
    a synchronization detection means for detecting a synchronous state established when a difference between the wheel speed and the estimated vehicle speed is within a predetermined range, and an asynchronous state established when said difference is more than said predetermined range;
    a slow pressurization signal setting means for producing a slow pressurization signal in response to the removal of the wheel locking symptom and during the asynchronous state; and
    a rapid pressurization signal setting means for producing a rapid pressurization signal in response to the establishment of said synchronous state and until the wheel cylinder pressure is increased to gain a predetermined percentage of said maximum pressure difference.

2. An antilock brake control apparatus as claimed in claim 1, further comprising:
    a depressurization actuator driven by the depressurization signal for reducing the pressure of the wheel cylinder; and
    a pressurization actuator driven by the slow pressurization signal or rapid pressurization signal for increasing the pressure of the wheel cylinder.

3. An antilock brake control apparatus as claimed in claim 2, wherein the depressurization and pressurization actuators comprise a variable flow control valve.

4. An antilock brake control apparatus as claimed in claim 1, wherein said predetermined percentage is 80%.

* * * * *

UNITED STATES PATENT AND TRADEMARK OFFICE
CERTIFICATE OF CORRECTION

PATENT NO. : 5,242,216
DATED : September 7, 1993
INVENTOR(S) : Yoichi MIYAZAWA et al.

It is certified that error appears in the above-indentified patent and that said Letters Patent is hereby corrected as shown below:

At column 4, line 25, change "ACTO" to ---ACTDO---.
At column 5, line 62, delete "(1)" (first occurrence).
At column 7, line 68, change "A" (second, third and fourth occurrences) to ---∫---.

Signed and Sealed this

Twenty-first Day of February, 1995

Attest:

BRUCE LEHMAN

Attesting Officer    Commissioner of Patents and Trademarks